United States Patent [19]
Chatterjee et al.

[11] Patent Number: 5,771,764
[45] Date of Patent: Jun. 30, 1998

[54] USE OF CUTTING TOOLS FOR PHOTOGRAPHIC MANUFACTURING OPERATIONS

[75] Inventors: Dilip K. Chatterjee; Syamal K. Ghosh, both of Rochester; Dennis J. Eichorst, Fairport, all of N.Y.

[73] Assignee: Eastman Kodak Company, Rochester, N.Y.

[21] Appl. No.: 931,782

[22] Filed: Sep. 16, 1997

Related U.S. Application Data

[63] Continuation of Ser. No. 556,346, Nov. 13, 1995, abandoned.

[51] Int. Cl.[6] ....................................................... B26D 1/00
[52] U.S. Cl. ................................. 83/13; 83/684; 83/690; 83/948
[58] Field of Search ........................... 83/948, 684, 685, 83/686, 690, 694, 695, 13

[56] References Cited

U.S. PATENT DOCUMENTS

| | | | |
|---|---|---|---|
| 2,122,368 | 6/1938 | Engler | 83/684 X |
| 2,847,069 | 8/1958 | Kopczynski | 83/686 |
| 3,162,565 | 12/1964 | Miller et al. | 83/948 X |
| 3,250,163 | 5/1966 | Smith | 83/685 X |
| 3,350,972 | 11/1967 | McKee, Jr. | 83/686 |
| 3,782,947 | 1/1974 | Krall | 96/67 |
| 3,974,728 | 8/1976 | Herlan | 83/686 |
| 4,275,103 | 6/1981 | Tsubusaki et al. | 428/148 |
| 4,279,945 | 7/1981 | Audran et al. | 427/130 |
| 4,302,523 | 11/1981 | Audran et al. | 430/140 |
| 4,394,441 | 7/1983 | Kawaguchi et al. | 430/524 |
| 4,416,963 | 11/1983 | Takimoto et al. | 430/69 |
| 4,418,141 | 11/1983 | Kawaguchi et al. | 430/530 |
| 4,431,764 | 2/1984 | Yoshizumi | 524/409 |
| 4,442,168 | 4/1984 | White et al. | 428/331 |
| 4,495,276 | 1/1985 | Takomoto et al. | 430/527 |
| 4,571,361 | 2/1986 | Kawaguchi et al. | 428/328 |
| 4,571,365 | 2/1986 | Ashlock et al. | 428/412 |
| 4,640,169 | 2/1987 | Fromson et al. | 83/685 |
| 4,729,274 | 3/1988 | Marbach | 83/684 |
| 4,793,231 | 12/1988 | Brown | 83/684 |
| 4,990,273 | 2/1991 | Bishop et al. | 252/62.54 |
| 4,999,276 | 3/1991 | Kuwabara et al. | 430/264 |
| 5,007,316 | 4/1991 | Ketcham et al. | 83/685 X |
| 5,122,445 | 6/1992 | Ishigaki | 430/523 |
| 5,175,132 | 12/1992 | Ketcham et al. | 501/103 |
| 5,204,219 | 4/1993 | Van Ooij et al. | 430/272 |
| 5,217,804 | 6/1993 | James et al. | 428/329 |
| 5,236,818 | 8/1993 | Carlson | 430/527 |
| 5,252,441 | 10/1993 | James et al. | 430/496 |
| 5,254,449 | 10/1993 | James et al. | 430/533 |
| 5,290,332 | 3/1994 | Chatterjee et al. | 65/18.1 |
| 5,294,525 | 3/1994 | Yamauchi et al. | 430/523 |
| 5,336,282 | 8/1994 | Ghosh et al. | 51/309 |
| 5,358,913 | 10/1994 | Chatterjee et al. | 501/103 |
| 5,368,995 | 11/1994 | Christian et al. | 430/530 |

FOREIGN PATENT DOCUMENTS

| | | |
|---|---|---|
| 250154 | 6/1986 | European Pat. Off. . |
| 0459349 | 5/1991 | European Pat. Off. . |
| 301827 | 7/1993 | European Pat. Off. . |
| 4-55492 | 2/1992 | Japan . |
| 91/11750 | 8/1991 | WIPO . |

*Primary Examiner*—Maurina T. Rachuba
*Attorney, Agent, or Firm*—Arthur H. Rosenstein

[57] ABSTRACT

A method of cutting, slicing or perforating photographic imaging elements using certain cutting tools is disclosed. The cutting tool material includes zirconia and yttria at a molar ratio of yttria to zirconia from about 0.5:99.5 to about 5:95. The cutting tool is essentially a tetragonal crystal phase grain for the interior in a surface of cubic crystal phase grain or monoclinic crystal phase grain. This provides a hard, tough outer surface with a tough core. The cutting tool material can also be a composite of zirconia-alumina with or without surface modification.

17 Claims, 4 Drawing Sheets

5,771,764

USE OF CUTTING TOOLS FOR PHOTOGRAPHIC MANUFACTURING OPERATIONS

This is a continuation of application Ser. No. 08/556,346, filed 13 Nov. 1995 now abandoned.

FIELD OF THE INVENTION

The present invention relates to novel methods for cutting, slitting and perforating photographic imaging elements comprising polymeric webs having coated thereon photographic materials such as photographic emulsions and magnetic, preferably transparent magnetic, recording elements which may contain abrasive inorganic particles thereon. More particularly, the present invention relates to the method of cutting said webs with specific cutting tools which will not adversely affect the elements and which are not adversely affected by the elements.

BACKGROUND OF THE INVENTION

Traditionally, photographic imaging elements include light sensitive silver halide emulsions in a hydrophilic binder such as gelatin on a polymeric support such as cellulose nitrate, cellulose diacetate, or cellulose triacetate. Traditional photographic imaging elements can include additional layers such as antihilation layers, curl control layers, antistatic layers, or protective layers either above or below the emulsion layer. These additional layers can be placed on either side of the support. The additional layers typically have been prepared using soluble constituents or polymeric materials dispersed in a polymeric binder, for example, soluble dyes for antihilation layers. The combination of silver halides or salts in a hydrophilic binder with retained moisture can result in a corrosive environment.

A wide variety of finishing operations are involved between coating of the photographic emulsion and auxiliary layers on the support and shipping. These operations are referred to as finishing operations and include slitting, cutting, perforating, and splicing of the photographic imaging element. These operations have, in the past, been accomplished using metal cutting tools, including knives, slitters, punches, perforators, etc. with little concern for wear or abrasion of the tooling or by the imaging element. However, increased manufacturing speeds have resulted in a more aggressive finishing environment, with associated down time for tooling replacement being particularly costly. In addition to the increased manufacturing speeds, changes in the photographic imaging elements and polymeric supports has exacerbated the wear and abrasion problems of the cutting tools. Examples of such changes in the film material include a change from cellulose esters to polyester film supports such as polyethylene terephthalate or polyethylene naphthalate due to the improved dimensional stability and toughness. Moreover, the auxiliary layers which have been predominantly polymer based with soluble salts or dyes have increasingly had solid particles (e.g., $Al_2O_3$, $SiO_2$, $TiO_2$, $SnO_2$, $Fe_2O_3$) added which tend to be abrasive in nature. Examples of specific applications involving solid particulates include solid particles dyes incorporated in antihalation layers; inorganic matte beads and particularly inorganic particles such as colloidal alumina or silica as protective overcoats and for friction control; antistatic layers consisting of conductive particles (e.g., $SnO_2$, ZnO, $ZnSb_2O_6$); and the addition of transparent magnetic recording layers containing magnetic particles (e.g., Fe, $Fe_2O_3$, $Fe_3O_4$, etc.) which may optionally containing additional abrasive particles such as aluminum oxide or silica. Most of the traditional antistatic systems for photographic applications employ ionic conductors. Charge is transferred in ionic conductors by the bulk diffusion of charged species through an electrolyte. Antistatic layers containing simple inorganic salts, alkali metal salts of surfactants, ionic conductive polymers, polymeric electrolytes containing alkali metal salts, and colloidal metal oxide sols (stabilized by metal salts) have been described previously. These ionic conducting antistatic layers have relatively low abrasivity, but may be corrosive.

An increasing need for abrasion resistant coatings and solid particles has resulted in increased wear or abrasion of tooling materials. The changes in antistatic layers and the addition of transparent magnetic recording layers have greatly increased the propensity for wear.

Further changes in photographic imaging elements which result in increased tooling wear are described below with particular reference to additions of abrasive particles for the improved antistatic performance, abrasion resistance, and for magnetic recording purposes.

Colloidal metal oxide sols which exhibit ionic conductivity when included in antistatic layers are often used in imaging elements. Typically, alkali metal salts or anionic surfactants are used to stabilize these sols. A thin antistatic layer consisting of a gelled network of colloidal metal oxide particles (e.g., silica, antimony pentoxide, alumina, titania, stannic oxide, zirconia) with an optional polymeric binder to improve adhesion to both the support and overlying emulsion layers has been disclosed in EP 250,154. An optional ambifunctional silane or titanate coupling agent can be added to the gelled network to improve adhesion to overlying emulsion layers (e.g., EP 301,827; U.S. Pat. No. 5,204,219) along with an optional alkali metal orthosilicate to minimize loss of conductivity by the gelled network when it is overcoated with gelatin-containing layers (U.S. Pat. No. 5,236,818). Also, it has been pointed out that coatings containing colloidal metal oxides (e.g., antimony pentoxide, alumina, tin oxide, indium oxide) and colloidal silica with an organopolysiloxane binder afford enhanced abrasion resistance as well as provide antistatic function (U.S. Pat. Nos. 4,442,168 and 4,571,365).

Antistatic systems employing electronic conductors have also been described. Because the conductivity depends predominantly on electronic mobilities rather than ionic mobilities, the observed electronic conductivity is independent of relative humidity and only slightly influenced by the ambient temperature. Antistatic layers have been described which contain conjugated polymers, conductive carbon particles or semiconductive inorganic particles.

Conductive fine particles of crystalline metal oxides dispersed with a polymeric binder have been used to prepare optically transparent, humidity insensitive, antistatic layers for various imaging applications. Many different metal oxides—such as ZnO, $TiO_2$, $ZrO_2$, $SnO_2$, $Al_2O_3$, $In_2O_3$, $SiO_2$, MgO, BaO, $MoO_3$ and $V_2O_5$—are claimed to be useful as antistatic agents in photographic elements or as conductive agents in electrostatographic elements in such patents as U.S. Pat. Nos. 4,275,103, 4,394,441, 4,416,963, 4,418,141, 4,431,764, 4,495,276, 4,571,361, 4,999,276 and 5,122,445. Preferred metal oxides are antimony doped tin oxide, aluminum doped zinc oxide, and niobium doped titanium oxide. In order to obtain high electrical conductivity, a relatively large amount (0.1–10 $g/m^2$) of metal oxide must be included in the antistatic layer. This results in increased wear or abrasion of finishing tools for thick antistatic coatings.

Antistatic layers comprising electro-conductive ceramic particles, such as particles of TiN, $NbB_2$, TiC, $LaB_6$ or MoB, dispersed in a binder such as a water-soluble polymer or solvent-soluble resin are described in Japanese Kokai No. 4/55492, published Feb. 24, 1992. The above-described ceramic particles are particularly hard and abrasive.

Conductive metal antimonate particles such as $ZnSb_2O_6$ or $InSbO_4$ dispersed in either hydrophilic or hydrophobic binders have also been disclosed as antistatic layers in U.S. Pat. No. 5,368,995.

As indicated above, the prior art on electrically-conductive layers in imaging elements is extensive and a very wide variety of different materials have been proposed for use as the electrically-conductive agent. However, the use of a high volume percentage of conductive particles to achieve the effective antistatic performance can result in increased tooling wear and in the formation of brittle layers that are subject to cracking and exhibit poor adhesion to the support material.

It is well known to include in imaging elements a transparent layer containing magnetic particles dispersed in a binder. Transparent magnetic layers and their use in photographic elements are described, for example, in U.S. Pat. Nos. 3,782,947, 4,279,945, 4,302,523, 4,990,276, 5,217,804, 5,252,441 and 5,254,449, in European Patent Application No. 0 459 349, published Dec. 4, 1991, and in Research Disclosure, Item 34390, November, 1992. As disclosed in these publications, the magnetic particles can consist of ferro- or ferrimagnetic oxides, complex oxides including other metals, metallic alloy particles with protective coatings, ferrites, hexaferrites, etc. and can exhibit a variety of particulate shapes, sizes and aspect ratios. The magnetic particles optionally can contain a variety of dopants and can be overcoated with a shell of particulate or polymeric material.

It is evident that many of the above described materials have traditionally been used as abrasive or polishing compounds due to their high hardness. Hence, the increase in manufacturing rates and abrasive nature of photographic film components results in more detrimental interaction between the film and the cutting tools. In particular, it is desirable to increase the hardness and toughness of the cutting tool materials in relation to the photographic imaging elements.

Photographic imaging elements include a photographic light sensitive imaging layer comprised of several silver halide emulsion layers or it may include a magnetic recording layer containing $Fe_2O_3$ or cobalt-modified $\gamma$-$Fe_2O_3$, for example, and an antistatic layer containing a conductive metal oxide, $SnO_2$, more preferably antimony doped tin oxide. In a particularly preferred embodiment, the magnetic recording layer may contain abrasive particles and the binder may be cross-linked. Other additives that increase the abrasive characteristics in photographic film include conductive metal oxides as disclosed in U.S. Pat. No. 4,571,361, colloidal metal oxides solids used primarily as antistatic agents as disclosed in U.S. Pat. Nos. 4,442,168 and 4,571,365 and various transparent magnetic recording layers as disclosed in Research Disclosures 34390 (November 1991), and 36446 (August 1994).

In addition to the physical damage imparted to the tooling materials by the increasingly abrasive nature of photographic film, there is also the concern of chemical damage or corrosion, particularly for metal parts due to the chemistry of the photographic emulsions and in auxiliary layers. Silver halides and other salts, for examples, contained in an ionically conducting antistatic layer, particularly in combination with moisture present in a hydrophilic binder such as gelatin results in a corrosive environment.

One solution to the high wear rates due to the interaction of the film and tooling materials is to apply a uniform coating of hard, tough material to a conventional metal tool. This can reduce the wear rate. However, a finite coating layer of optimal uniformity is required. This results in additional manufacturing complexities to the original tool that must be fabricated and finally coated usually by a coating facility other than the original tool manufacturer. One of the operational difficulties of such coatings on cutting tools is that the coatings may spall, crack and delaminate from the underlying tool material during operation. Once the thin coating is worn away, a tremendous increase in wear rate is observed due to the softer underlying material.

The present invention overcomes the deficiencies of the use of traditional tooling materials with photographic webs by providing a tough strong ceramic material which is chemically inert and therefore not subject to corrosion. Furthermore, the tools according to the present invention are prepared from the same material thereby eliminating the need for coating the tool. The tools according to the present invention are particularly well suited to high speed finishing of corrosive abrasive photographic films, papers and polymeric webs in general.

SUMMARY OF THE INVENTION

The present invention is a photographic manufacturing operation comprising using a ceramic (cutting) tool for finishing photographic imaging elements. The cutting tool consists essentially of yttria doped zirconia. The operation comprises the method of cutting, slitting, or perforating photographic imaging elements thereon, said method comprising cutting said web with a cutting tool comprising zirconia or a zirconia-alumina composite doped with either yttria, ceria, calcia, magnesia or combinations thereof in a molar ratio of dopant to zirconia from about 0.5:99.5 to about 25:75 wherein said doped zirconia is in the tetragonal crystal phase (TZP-tetragonal zirconia polycrystals). In the specific case of yttria doped zirconia the molar ratio of yttria to zirconia varies from 0.5:99.5 to about 5:95 to form Y-TZP (yttria stabilized tetragonal zirconia polycrystals). For other dopants and their combinations the dopant concentration varies from 0.5 to 25 moles depending on dopant species to obtain tetragonal zirconia.

In an alternative embodiment of the present invention the ceramic comprises a tetragonal crystal phase interior and a monoclinic crystal phase surface.

In yet another alternative of the present invention the ceramic comprises a tetragonal crystal phase interior and a cubic crystal phase surface.

In yet another alternative of the present invention the ceramic comprises a composite of zirconia and alumina having tetragonal zirconia and $\alpha$-alumina at the interior and a mixture of cubic spinel and tetragonal or cubic zirconia at the surface.

Figure 1:
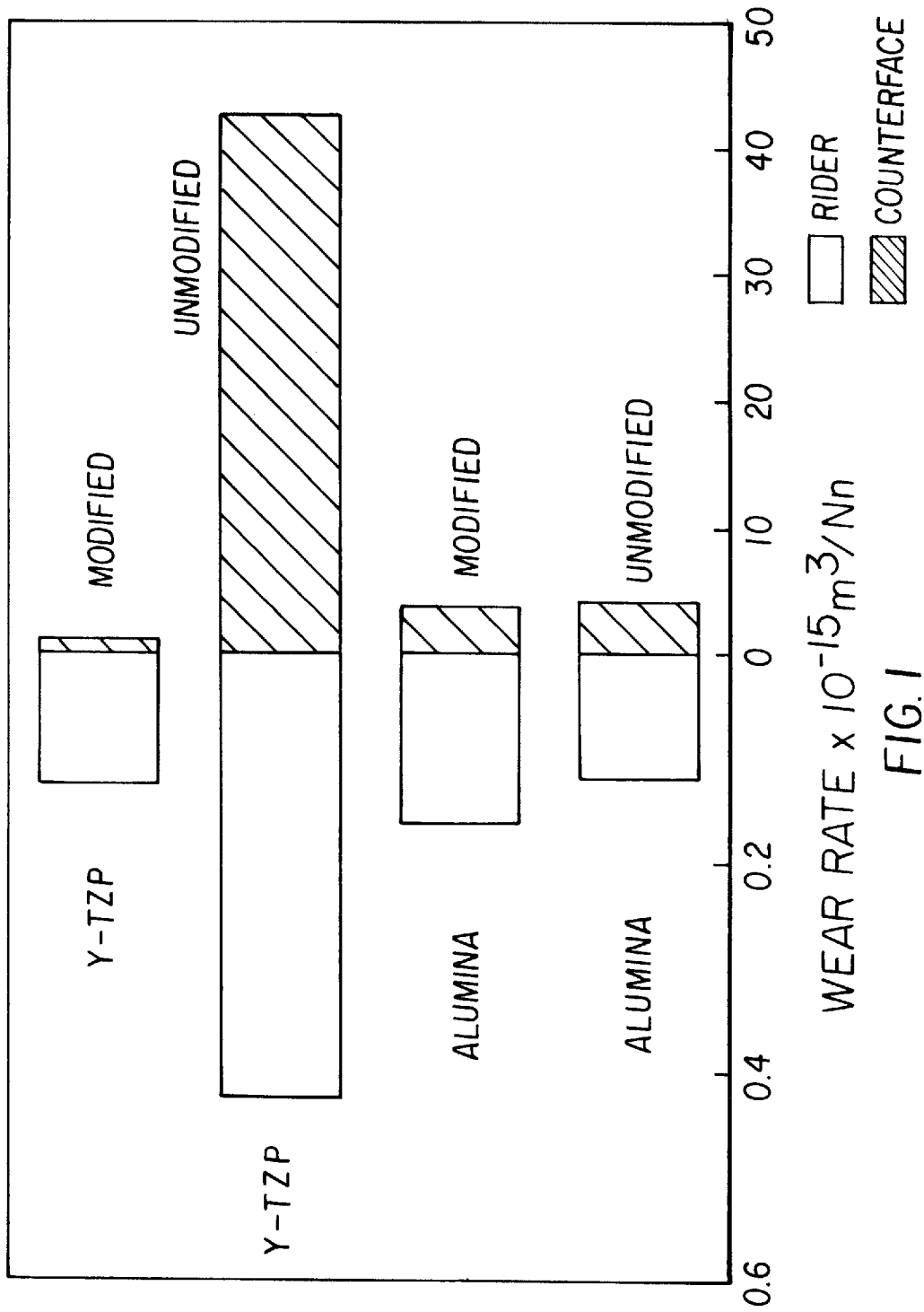
FIG. 1 shows the wear rates with respect to Y-TZP and alumina riders (balls) for zirconia-20% alumina composites before and after surface modification by magnesia diffusion.

For a better understanding of the present invention, together with other and further objects, advantages and capabilities thereof, reference is made to the following detailed description and appended claims in connection with the preceding drawings and description of some aspects of the invention.

DETAILED DESCRIPTION OF THE PREFERRED EMBODIMENTS

The photographic imaging elements may or may not contain particles of abrasive nature in the emulsion layer(s) or in auxiliary layers either on the same side of the support as the emulsion or on the side of the support opposite to the emulsion. The emulsions consist of silver halides contained in a hydrophilic binder such as gelatin on a polymeric support such as cellulose derivatives including cellulose nitrate, cellulose diacetate or cellulose triacetate or a polyester support such as polyethylene terephthalate (PET) or polyethylene naphthalate (PEN). The photographic film may have additional layers such as antihalation layers, curl control layers, antistatic layers, magnetic layers, or protective layers either above or below the emulsion layer on the same side of the support, or alternatively on the side of the support opposite the emulsion layer.

Transparent magnetic recording layers which can be advantageously used in a photographic imaging element are described in Research Disclosure Item 34390, November 1991. As disclosed in these publications, the magnetic particles can consist of ferro- or ferrimagnetic oxides, complex oxides including other metals, metallic alloy particles with protective coatings, ferrites, hexaferrites, etc. and can exhibit a variety of particulate shapes, sizes and aspect ratios. Ferromagnetic oxides useful for transparent magnetic recording layers including $\gamma$-$Fe_2O_3$, $Fe_3O_4$ and chromium oxide. The magnetic particles can be in solid solution with other metals and/or contain a variety of dopants and can be overcoated with a shell of particulate or polymeric materials. Preferred additional metals as dopants, solid solution components or overcoats are Co and Zn for iron oxides; and Li, Na, Sn, Pb, Co, Ni, and Zn for chromium oxide. Additionally magnetic oxide particles may contain a thicker layer of a lower refractive index oxide or other material having a low optical scattering cross-section as taught in U.S. Pat. Nos. 5,217,804 and 5,253,441. Cobalt surface treated $\gamma$-iron oxide is the preferred magnetic particle. The magnetic particles may be dispersed in either a hydrophilic or hydrophobic binder. The transparent magnetic layer comprises a dispersion of cobalt-modified gamma-iron oxide particles in a polymeric binder with an optional crosslinker. Total dry coverage for the magnetic layer is nominally about 1.5 $g/m^3$. An optional lubricant-containing layer containing carnuba wax and a fluorinated surfactant as a wetting aid can be coated on top of the transparent magnetic layer at a nominal dry coverage of about 0.02 $g/m^2$. The support or polymeric web used is preferably polyethylene terephthalate or polyetheylene naphthalate with a tie layer consisting of a terpolymer latex. On the support can be coated an electrically-conductive layer consisting of conductive tin oxide, metal antimonate, or vanadium oxide gel dispersed in a polymeric binder.

The imaging element consists of a photographic light-sensitive imaging layer comprised of several silver halide emulsion layers, and can include a magnetic recording containing layer comprised of $Fe_2O_3$, for example, and an antistatic layer containing a conductive metal oxide, $SnO_2$, for example. In a particularly preferred embodiment, the magnetic recording layer may contain abrasive particles, and the binder may be cross-linked. This disclosed imaging element exemplifies the possible additives which can increase the abrasive characteristics of a photographic film material in addition to the silver halide emulsion layers. The conductive metal oxides used as antistatic agents are disclosed by Fuji (U.S. Pat. No. 4,571,361 - involving $SnO_2$, ZnO, $TiO_2$ etc.) and Kodak (U.S. Pat. No. 5,368,995 - involving $ZnSb_2O_6$). The colloidal metal oxide sols used primarily as antistatic agents and in some cases to improve abrasion resistance are disclosed in U.S. Pat. Nos. 4,442,168 and 4,571,365 (involving Ludox —$SiO_2$, $Al_2O_3$, $ZrO_2$, etc.). Various aspects of transparent magnetic recording layers and their incorporation along with photographic materials are disclosed in PCT Patent 91/11750, Research Disclosure 34390 (Nov. 1991), and 36446 (Aug. 1994). These disclosures disclose basic magnetic layers, combinations of magnetic and abrasive particles, and filler particles for durability and head cleaning. U.S. Pat. No. 5,294,525 by Konica discloses a combination of $SnO_2$ antistat with a magnetic layer.

In addition to the physical damage imparted to the tooling materials by the film, there is chemical damage or corrosion, particularly, for metallic and cemented carbide parts due to the chemistry of photographic emulsions and addenda in auxiliary layers.

The present invention overcomes the deficiencies of the use of traditional tooling materials in cutting photographic films by providing a tough, strong material which is chemically inert and therefore, not subject to corrosion. Furthermore, the invention is advantageous with respect to coated tools since the entire piece is prepared of the same material and no differential wear rates exist. Finally, the additional coating step can be eliminated. The tooling materials of the present invention are particularly well suited to the high-speed finishing of corrosive, abrasive photographic films, papers and polymeric webs (multi-layered) in general.

Pure zirconia can exist in three crystallographic states depending upon the temperature. The low temperature form of zirconia is the monoclinic form. As the temperature increases, the monoclinic crystal phase first transforms to a tetragonal crystal phase and then to a cubic crystal phase. It is known that high temperature phases of zirconia can be made stable at room temperature by carefully alloying it with compounds such as yttria, magnesia, calcia and ceria. These methods are described in U.S. Pat. Nos. 5,290,332; 5,336,282; and 5,358,913.

Moreover, it is also known that impact bearing tools or parts have longer service life and better performance records if the core of these tools or parts is made of a tough material and the surface or encasing of the tool or part is made of a very hard material. A common example of such a cutting tool in metallic materials is nitrided or case carburized tools. The surface treatments such as carburizing, nitriding, etc. form stable hard phases which are dependent on the reactivity of the parent metallic material with species such as carbon and nitrogen. However, in ceramics such composite structures are difficult to achieve because of their inherent chemical inertness.

This invention uses monolithic tetragonal zirconia as cutting tools but it is preferred to use a stabilized zirconia which has a tetragonal core and either a monoclinic crystal phase casing or a cubic crystal phase casing. Cutting tools produced by the above-disclosed process are capable of withstanding higher impact load during their operations because of their greater fracture toughness. The cutting surfaces on the tools have superior wear and abrasion resistance than traditional cutting tools.

The cutting tools are made by forming powders of the zirconia material and compacting in a mold/die assembly to form compact parts. The parts are then sintered at temperatures of 1400° to 1600° C. for 1 to 3 hours. During the sintering process, surfaces can be modified by diffusing MgO, CaO, $Y_2O_3$, $ScO_3$ and $CeO_2$ for zirconia and MgO, FeO, ZnO, CoO, NiO and MnO for zirconia-alumina composites.

The following illustrate the formation of the cutting tools used in the present invention:

a) $ZrO_2$ powders were alloyed with up to 5 mole % $Y_2O_3$ (preferred—3 mole %) and calcined to get single phase tetragonal structure. These alloyed zirconia powders were cold compacted in a die in the form of a desired shape to form tools or objects. The pressure for cold compaction was varied between 10 and 30 kpsi (preferred—15 kpsi). These parts were sintered at temperature ranging from 1400° to 1600° C. for times varied between 1 and 3 hours (preferred—1500° C. for 2 hours). During sintering these parts are kept on a flat substrate or a plate capable of withstanding high temperatures. The plate chosen was made of tetragonal zirconia. For the parts which had been sintered at high temperature by placing those on $Al_2O_3$ plates also shows the presence of only the tetragonal phase.

b) Some of the green parts compacted for the illustration above were sintered for 2 hours at 1500° C. by placing them on MgO plates. The normal x-ray diffraction patterns taken on these samples indicate that the bulk of the samples is tetragonal in crystal structure, whereas the glancing angle x-ray diffraction scan shows the presence of cubic crystal structure on the surfaces of these sintered parts. The surface hardness of these samples fall in the range of 1500 to 1700 Knoop Hardness Number (KHN).

c) A few green compacted parts were sintered by placing them on $Al_2O_3$ and/or $ZrO_2$ plates, but very fine (0.3 μm) MgO powders were sprinkled at the interface of the pellets and plates. The surface crystal structure of the sintered parts in contact with MgO was cubic in nature, although the bulk crystal structure of the samples sintered in this manner was tetragonal.

d) Metallo-Organic Decomposition (MOD) consists of combining precursor(s) of the desired metal(s) in the appropriate ratio(s), followed by their thermal decomposition. This decomposition then yields an 'atomic level' mixture of metal oxide(s) or metal carbonate(s). The experiments for this illustration consist of spin coating of MgO precursor for MOD on green compacted parts of $ZrO_2$ and sintering the parts by placing those either on $Al_2O_3$ or on $ZrO_2$ plates, and following the usual sintering schedule. A typical x-ray diffraction scan on the surfaces of such samples indicates the major phase present on the surfaces of those parts are cubic. However, these x-ray scans also indicate the presence of minor (<1%) amount of monoclinic phase on the surfaces of the parts.

e) This particular illustration deals with achieving a hard monoclinic phase on the surface of tough tetragonal $ZrO_2$. In this invention surfaces of sintered tetragonal $ZrO_2$ were abraded on abrasive paper such as sand paper, and the surfaces were examined using x-ray diffraction. The complete transformation of surface tetragonal phase to monoclinic phase was achieved. The surface hardness of such samples were in the range of 1500 to 1600 KHN.

During the sintering stages, the diffusion of stabilizing molecules helps to modify the surface phases of the parts. This type of diffusion of stabilizing molecules are not possible once the parts are completely sintered. In illustration a), the zirconia and alumina plates on which the green parts were placed are considered to be inert and did not contribute to the diffusion process.

The advantages of the above-described invention relate to efficient cutting, perforating, slitting, and chopping of photographic film, paper and other photographic imaging elements or other recording layers containing corrosive chemicals many of which have hard abrasive particulate coatings. The advantages of the present invention are most beneficial when converting or finishing a web containing hard or abrasive particles. This invention provides simple, cost effective ways of using ceramic cutting tools. The cutting tools can be composite structures which have hard, wear, and abrasion resistant casings on the surfaces of tough interiors. This type of structure is extremely suitable where tribological (wear and abrasion) properties of the materials are of prime interest.

Figure 2:
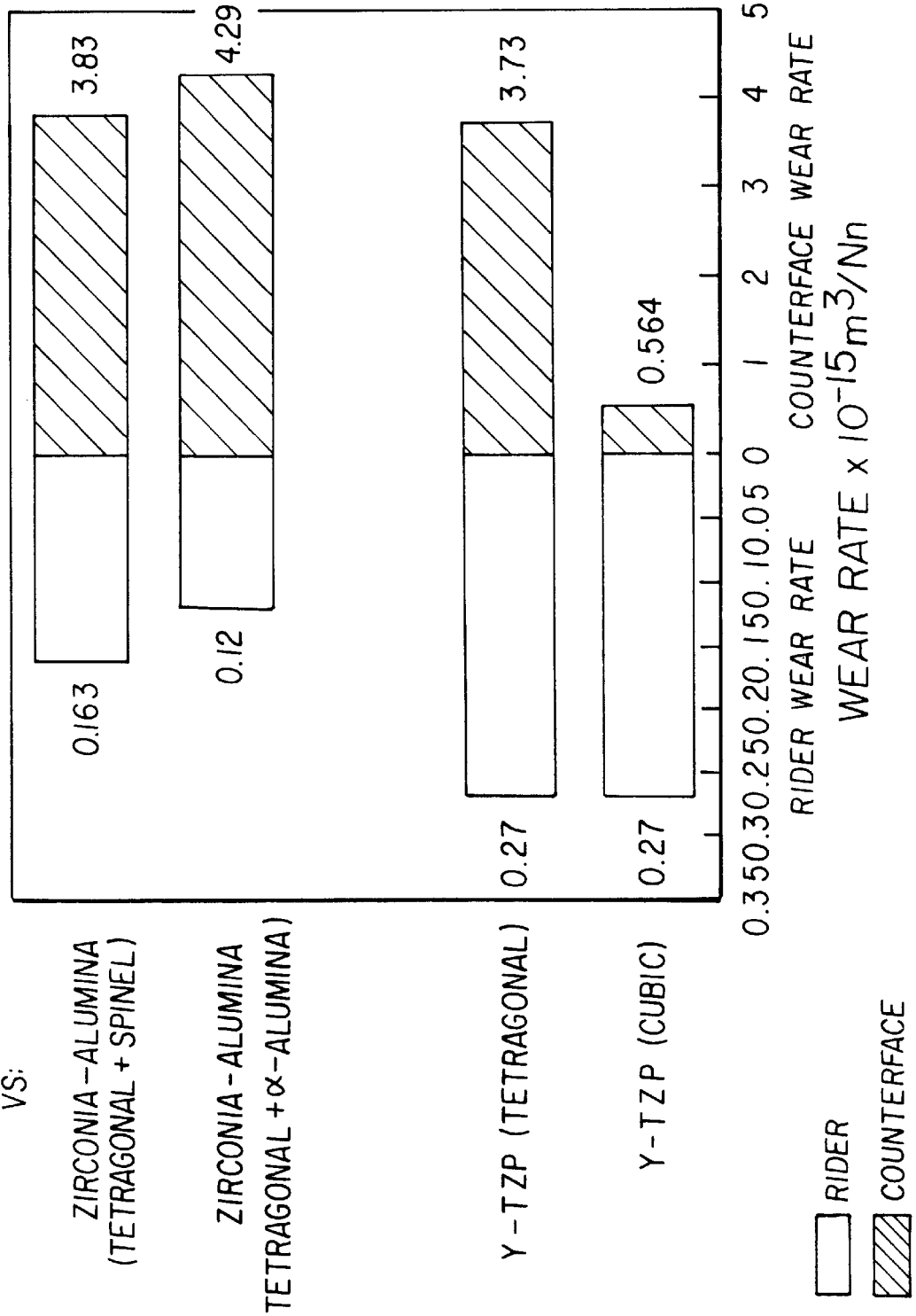
FIG. 2 shows results of reciprocating wear tests of different forms of zirconia and zirconia composites.
Figure 3:
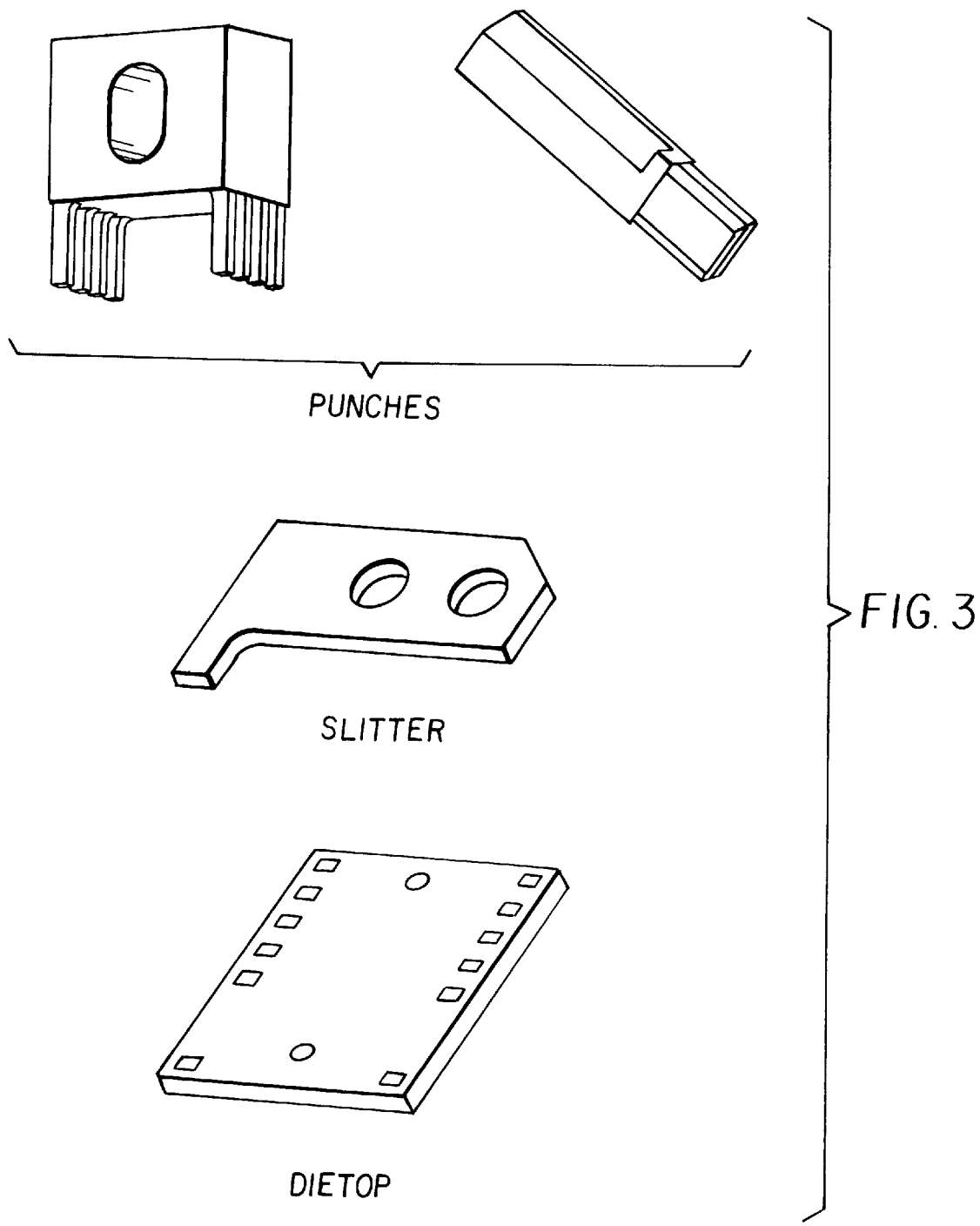
FIG. 3 shows various cutting tools.

The comparison of wear resistance when cutting polymeric webs having photographic emulsions containing abrasive materials thereon in terms of wear rates of different crystallographic forms of zirconia, zirconia-alumina composites and their modified surface versions are shown in the following examples and in FIGS. 1 and 2. The abrasion tests were conducted employing a loop abrasion tester and the wear tests were conducted employing a reciprocating wear tester. Table 1 shows a comparison between abrasion volume losses of different traditional tool materials and zirconia ceramics. From this data it is clearly evident that zirconia ceramic material has superior abrasion resistance. Typical punches, slitters, and die tops manufactured employing the techniques described in this invention are shown in FIG. 3.

EXAMPLE 1

Wear tests were carried out and wear rates were determined using a reciprocating wear tester and the results are illustrated in FIG. 1. Flat samples (counterface) were placed on a reciprocating platform and subjected to wear by a rider ball (12 mm diameter) mounted on a weighted arm. The riders (balls) used in this investigation were made from either Y-TZP and/or 99.9% $Al_2O_3$. The normal load on the ball was 500 g. For all wear tests the reciprocating frequency was 60 cycles/min, the stroke length 25 mm and the test time 2 hours. Sliding wear volumes for all the tests were computed from the profilometric traces of the wear tracks. Abrasion tests were also carried out using a loop abrasion tester. A continuously running abrasive belt was run against the flat surfaces of the samples. The abrasive particles on the belt were $SiO_2$ (24 μm). The belt speed, normal load and test time for such tests were 0.5 m/sec, 200 g and 8 hours respectively. Abrasive wear volumes were computed from profilometric trace measurements.

TABLE 1

| Cutting Material | Volume loss (cubic mm) |
| --- | --- |
| Tetragonal zirconia | $5.8 \times 10^{-3}$ |
| Cubic zirconia | $3.7 \times 10^{-3}$ |

TABLE 1-continued

| Cutting Material | Volume loss (cubic mm) |
|---|---|
| Monoclinic zirconia | $3.6 \times 10^{-3}$ |
| AISI 420 stainless steel | 7.7 |
| AISI D2 tool steel | 1.5 |
| AISI M4 tool steel | 0.5 |
| CPM 10V tool steel | 0.4 |

EXAMPLE 2

One example of a particularly abrasive photographic imaging element is a photographic film containing a transparent magnetic layer as disclosed in Research Disclosure Nos. 34390 and 36446. The film element included a polyethylene terephthalate support which was coated with a vinylidene chloride based terpolymer as a tic layer. The transparent magnetic layer included cobaltmodified gamma-iron oxide magnetic particles dispersed in a cellulose acetate binder. In addition to the magnetic particles, abrasive aluminum oxide particles were included. The test involved placing upper and lower perforator tools in a modified perforating machine and evaluating volume of perforator material removed after one million perforator cycles against the described abrasive photographic imaging element. The perforating machine was modified to give a wide clearance to avoid film jams or chipping of the perforator tools. The perforator tools evaluated were zirconia and 440C stainless steel. The volume of perforator material removed was $27.4 \times 10^{-6}$ $\mu m^3$ for 440C stainless steel and $3.2 \times 10^{-6}$ $\mu m^3$ for the zirconia testing. These results show improved wear resistance more than 8 times for the zirconia tool against the abrasive photographic imaging elements in comparison to the stainless steel tool.

EXAMPLE 3

Figure 4:
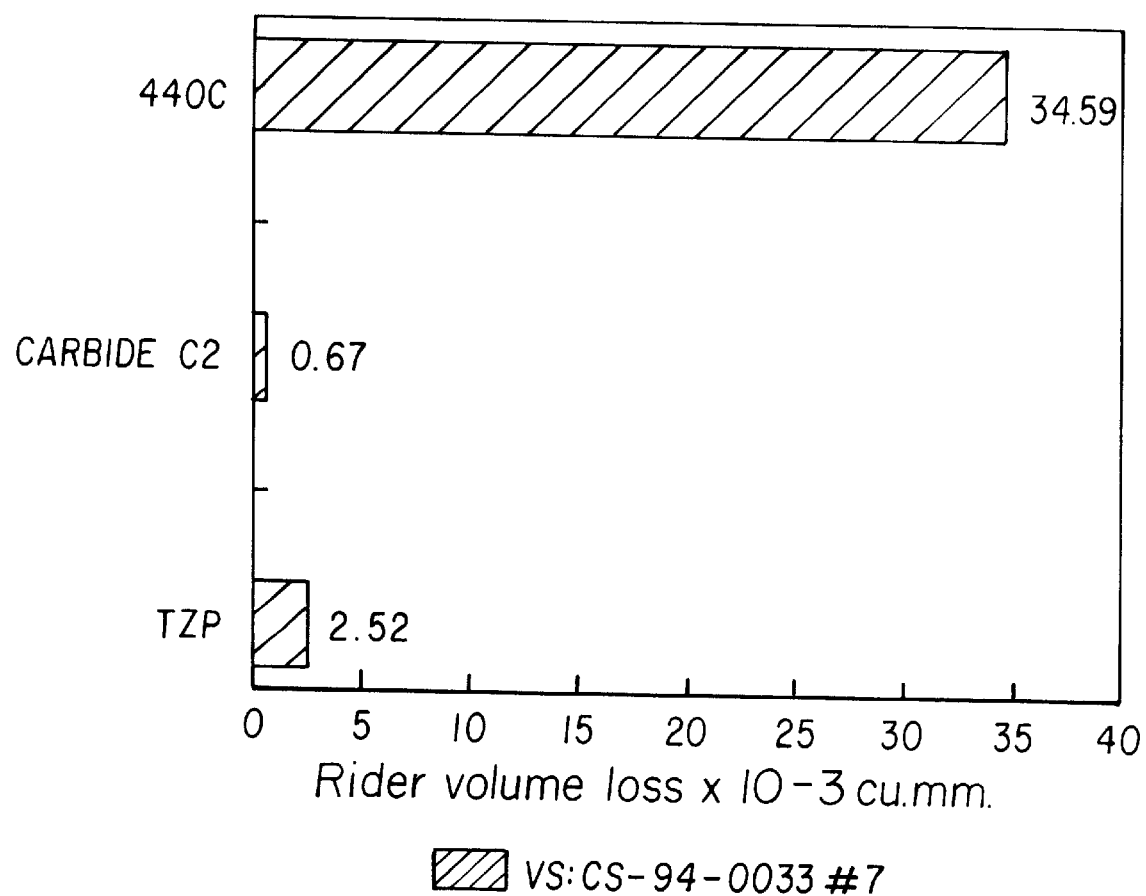
FIG. 4 shows results of wear to various cutting tools due to the cutting of photographic film.

To a 500 foot long by 6.0 inches wide roll of the photographic imaging element described in Example 2 was conducted abrasion tests on a reciprocating tester. The three rider materials were 440C stainless steel, TZP and tungsten carbide (0.25 inch diameter) balls. In this test, a six inch by six inch sheet of film was attached to rotating platens. Three arms containing the riders were brought into contact with the platens and dead weight loaded with 1000 grams each. The arms reciprocate with a stroke length of 2.5 inches and 60 cycles per minute while the platens rotate at 0.8 RPM (revolutions per minute). The purpose of the rotating platen is to distribute the wear on the film sample evenly so as not to wear through the film in one spot. Each film was tested for a total of 40 hours each and the film samples were changed after each hour. The total sliding distance for each material was 60,000 feet of continuous sliding. Evaluation of the rider wear scars were made by optical photomicrographs. Volume loss of the rider materials were calculated from the wear scar diameters. The volume losses for the various materials are summarized and graphically presented in FIG. 4. It appeared that the film was most abrasive to the 440C steel rider (greater than ten times wear/volume loss compared to TZP or carbides). Sliding wear characteristics of carbides, however, are slightly better than that of TZP.

EXAMPLE 4

Corrosion tests of the tooling materials were conducted as follows: photographic films were wrapped around the flat surfaces of the candidate tool materials, such as tungsten carbide containing 6% Co (C2), tool steels (440C) and zirconia (TZP), and were stored in a controlled environment chamber having 90% RH and 90° F. temperatures for 30 days. Susceptibility to corrosion was measured by observing the samples under a microscope, and by weighing in a micro-balance. All the conventional tool materials and tungsten carbide containing 6% Co showed propensity to corrosion with the exception of TZP. The above test clearly demonstrated that TZP is not susceptible to corrosion in contact with photographic elements.

EXAMPLE 5

Perforating punches with very tight tolerances (50 millionth of an inch) were made from tetragonal zirconia ceramic and also from cobalt bonded tungsten carbide. These punches were retrofitted in a perforating machine capable of perforating/punching motion picture products at 3450 punches per minute. The types of film (emulsion coated web) used were based on polyethylene terephthalate or acetate based webs.

The punches made from zirconia ceramic survived at least the same punch cycles as that of punches made from carbides, particularly in the extreme cases of film jam in the machines. However, when a perforating machine is stopped for bad cut quality, both the carbide punches and dies needed to be replaced, whereas the zirconia punches were accredited for continued production type perforation.

The above results show that the zirconia does prevent fracture of the punches during film jam situation in the perforating machine. The rejection of carbide dies and punches for inferior cut quality and continued accreditation of the zirconia punches indicate superior tribo-characteristics of zirconia with respect to emulsion coated web.

In the finishing operations of photographic imaging elements, one needs to consider impact resistance, corrosion resistance, wear resistance and strength/hardness of the tools. Foregoing examples indicated both TZP and carbides are far superior to conventional tooling such as 440C steel. Based on toughness and sliding wear characteristics, carbide would be expected to be a material of choice for tool material. However, examples 4 and 5 demonstrate the superior nature of TZP over carbide.

While the invention has been described with particular reference to a preferred embodiment, it will be understood by those skilled in the art the various changes can be made and equivalents may be substituted for elements of the preferred embodiment without departing from the scope of the invention. In addition, many modifications may be made to adapt a particular situation in material to a teaching of the invention without departing from the essential teachings of the present invention.

We claim:

1. A method of cutting, slitting and perforating photographic imaging elements comprising polymeric webs coated with materials selected from the group consisting of photographic emulsions and magnetic recording layers, said method comprising cutting said photographic imaging elements with a cutting tool comprising a member of the group consisting of zirconia and zirconia-alumina composite doped with a member of the group consisting of yttria, ceria, calcia, and magnesia wherein the molar ratio of yttria to zirconia is from about 0.5:99.5 to about 5:95 for a cutting tool comprising zirconia doped with yttria; and wherein the molar ratio of a member of the group consisting of ceria, calcia and magnesia, to zirconia is from about 0.5:99.5 to about 25:75 for a cutting tool comprising zirconia doped with a member selected from the croup consisting of ceria, calcia and magnesia, and wherein said doped zirconia is in the tetragonal phase.

2. The method of claim 1 wherein the photographic imaging elements contains abrasive particles.

3. The method of claim 1 wherein the cutting tool has a cubic crystal phase surface.

4. The method of claim 1 wherein the cutting tool has a monoclinic crystal phase surface.

5. The method of claim 1 wherein the cutting tool comprises an interior and surface wherein the interior comprises a composite of tetragonal zirconia and alumina and the surface comprises a mixture of cubic spinel, tetragonal zirconia and cubic zirconia.

6. The method of claim 1 wherein the cutting tool comprises a punch.

7. The method of claim 2 wherein the abrasive particles contain a member of the group consisting of aluminum oxide, silica and combinations of aluminum oxide and silica.

8. The method of claim 2 wherein the abrasive particles are ceramic.

9. The method of claim 1 wherein the photographic imaging element comprises a transparent magnetic recording layer.

10. The method of claim 9 wherein the magnetic recording layer contains abrasive materials.

11. The method of claim 9 wherein the abrasive particles contain a member selected from the group consisting of aluminum oxide, silica and combinations of aluminum oxide and silica.

12. The method of claim 9 wherein the transparent magnetic recording layer contains iron oxides.

13. The method of claim 1 wherein the doped zirconia comprises a zirconia-alumina composite.

14. The method of claim 1 wherein the zirconia is doped with yttria in a molar ratio of yttria to zirconia of from about 0.5:99.5 to about 5:95.

15. The method of claim 1 wherein the zirconia is doped with a member selected from the group consisting of calcia, magnesia and ceria in a molar ratio of said member to zirconia of from about 0.5:99.5 to about 25:75.

16. The method of claim 2 wherein the abrasive particles include conductive metal oxides selected, from the group consisting ot ZnO, $TiO_2$, $ZrO_2$, $SnO_2$, $Al_2O_3$, $In_2O_3$, $SiO_2$, MgO, BaO, $MoO_3$, $V_2O_5$, $WO_3$ and combinations thereof.

17. The method of claim 2 wherein the abrasive particles include metal antimonates selected from the group consisting of zinc antimonate and indium antimonate.

* * * * *